Sept. 2, 1958  M. D. LIVINGOOD  2,850,467
CONTINUOUS PRODUCTION OF CELLULAR POLYURETHANE PLASTICS
Filed April 30, 1956
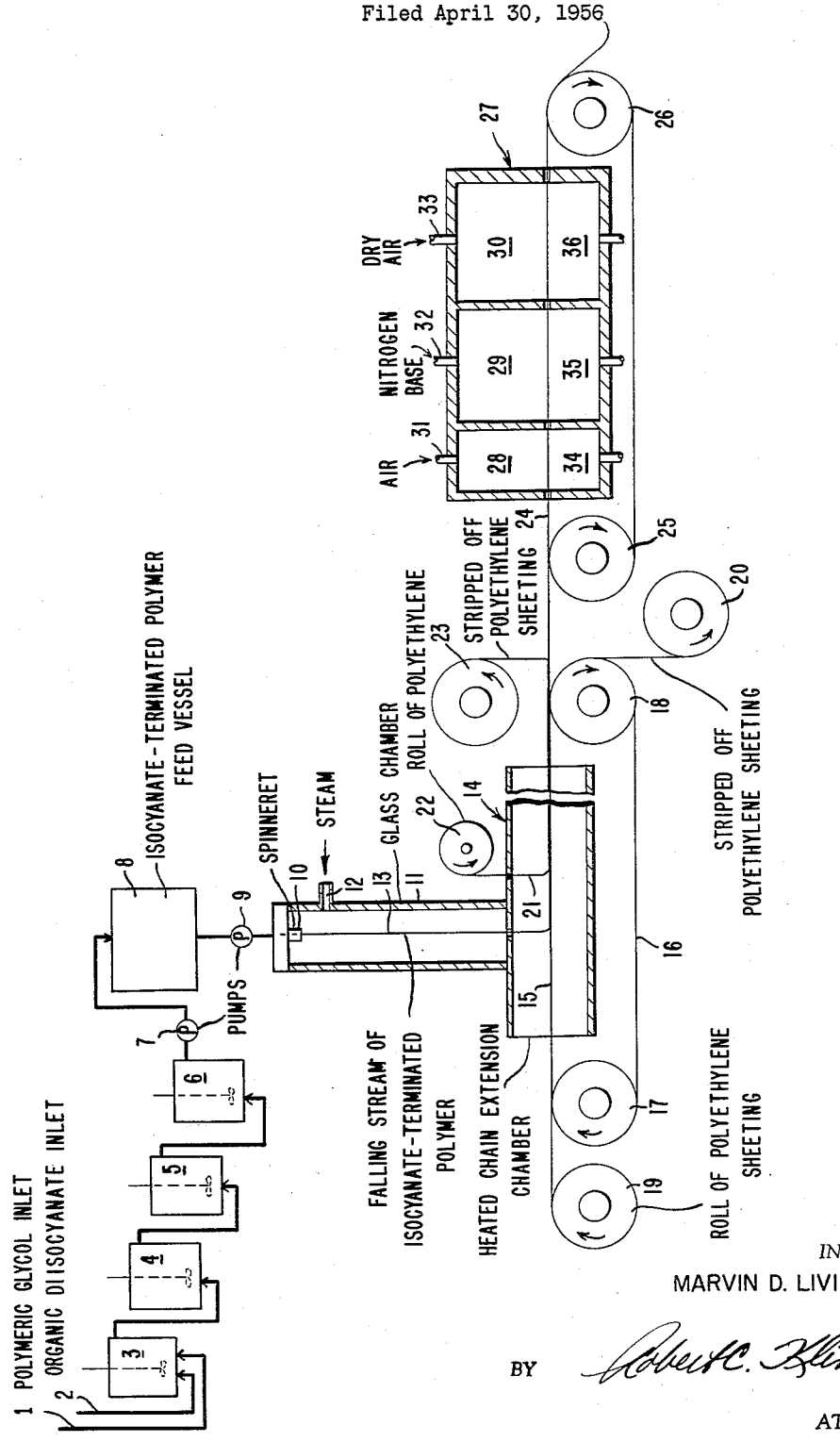
INVENTOR
MARVIN D. LIVINGOOD
BY
ATTORNEY United States Patent Office 2,850,467
Patented Sept. 2, 1958

2,850,467

CONTINUOUS PRODUCTION OF CELLULAR POLYURETHANE PLASTICS

Marvin D. Livingood, Newark, Del., assignor to E. I. du Pont de Nemours and Company, Wilmington, Del., a corporation of Delaware Application April 30, 1956, Serial No. 581,463

5 Claims. (Cl. 260—2.5)

This invention relates to a process for the preparation of elastomers, and more particularly to a continuous process for preparing stable polyurethane elastomers.

Heretofore, in the preparation of polyurethane elastomers, such as from a polyalkylene ether glycol, an organic diisocyanate, and a chain-extending agent, an isocyanate-terminated prepolymer is prepared by reacting a molar excess of organic diisocyanate with the polyalkylene ether glycol. When this isocyanate-terminated prepolymer is reacted with the chain-extending agent, the molecular weight of the polymer is rapidly increased. This is accompanied by increasing viscosity and ultimately leads to a solid polymer. When this chain-extension is carried out in apparatus having moving parts opposing fixed parts or other moving parts, some of the polymer frequently remains as a thin film on the surfaces. As the molecular weight increases, a solid builds up in the apparatus which forces a shutdown of the equipment. The increased molecular weight also requires heavy duty machinery to handle the rubbery polymer. It is quite obvious that it would be highly desirable to be able to provide a process which avoids this accumulation of solid polymer and permits continuous operation without the forced shutdowns previously necessary and avoids the use of expensive, heavy duty machinery.

It is an object of the present invention to provide a process for preparing polyurethane elastomers. A further object is to provide a continuous process of preparing stable polyurethane elastomers from isocyanate-terminated polymers. Other objects will appear hereinafter.

These and other objects of the present invention are accomplished by the continuous process for preparing stable polyurethane elastomers which comprises extruding a stream of isocyanate-terminated polymer into an atmosphere containing water vapor, said polymer being extruded at a temperature below the dew point of the said atmosphere, maintaining said stream in said atmosphere until at least 0.5 mol of water per mol of isocyanate-terminated polymer has been taken up, continuously conveying the resultant mass through a chamber maintained at about 50 to 100° C. until a self-supporting, porous structure is formed, continuously conveying said porous structure through a chamber wherein dry air is drawn through said structure, followed by drawing the vapor of a nitrogen base having at least one hydrogen atom attached to a nitrogen atom through said porous structure to stabilize it, followed by drawing dry air through said porous structure, and recovering the resultant stable polyurethane elastomer.

The process of the present invention is relatively simple and is more particularly illustrated by the accompanying diagrammatic sketch.

In the sketch, 1 and 2 represent feed lines for the polymeric glycol and organic diisocyanate respectively; 3, 4, 5 and 6 represent agitated vessels arranged in cascade relation; 7 is a pump for feeding the isocyanate-terminated polymer into the feed vessel 8; 9 is a positive displacement pump for feeding the isocyanate-terminated polymer through a spinneret 10 located at the top of a glass water vapor chamber 11. 12 represents a steam inlet and 13 represents a falling stream of isocyanate-terminated polymer. As this stream falls through the glass chamber 11, water condenses thereon since the polymer is introduced into the chamber at a temperature below the dew point of the atmosphere in the chamber. The stream or filament of polymer drops from the chamber 11 into a heated chamber 14 and onto a sheet of polyethylene 15 which is supported on a continuous endless belt 16. 17 and 18 represent an idler pulley and drive pulley respectively for the belt. The polyethylene sheet is supplied by roll 19 and the sheet is collected on a drive pulley 20. As the isocyanate-terminated polymer is passed through the heated chamber 14, it is continuously covered by a second sheet of polyethylene 21 which is supplied by roll 22 and collected on roll 23. As the isocyanate-terminated polymer passes through the heated chamber 14, it is chain-extended and is converted to a self-supporting, porous, continuous structure which rides off of belt 16 onto a continuous, endless, porous belt 24, which carries the structure into a chamber 27 which is divided into three sections 28, 29 and 30. 25 and 26 represent the idler pulley and drive pulley respectively for the porous belt 24. As the porous structure passes through the chamber 27, air is drawn through the structure in section 28, the vapor of a nitrogen base is drawn through it in section 29 and this is followed by the drawing of more air through the structure in section 30. The nitrogen base and air are supplied to sections 28, 29 and 30 by means of inlets 31, 32 and 33, and they are drawn through the porous structure by means of vacuum chambers 34, 35 and 36 located below the porous belt. As the porous structure passes out of the chamber 27, it is collected or discharged as a stabilized, porous polyurethane elastomer.

In carrying out the process of the present invention, the isocyanate-terminated polymer is extruded through an orifice or spinneret 10 and is allowed to fall freely through a chamber 11, having an atmosphere containing water vapor. This isocyanate-terminated polymer may be prepared from a polymeric glycol and an organic diisocyanate by several general procedures as more particularly illustrated in the following examples. Any of a wide variety of polymeric glycols having a molecular weight of from 750 to 10,000 may be used; however, for purposes of the present invention, the polymers prepared from polyalkylene ether glycols, more particularly polytetramethylene ether glycols, are preferred. It is to be understood that other glycols, such as polyalkylenearylene ether glycols, polyalkylene ether-thioether glycols and polyester glycols, including alkyd resins, may be used.

In the preparation of the isocyanate-terminated polymers, a molar excess of a polymeric glycol such as a polyalkylene ether glycol may be first reacted with an organic diisocyanate to prepare a polyurethane glycol which may subsequently be reacted with a molar excess of an organic diisocyanate so as to prepare an isocyanate-terminated polymer. Alternatively, the polymeric glycol may be reacted directly with a molar excess of an organic diisocyanate. In the preparation of these polymers, overall molar ratios of organic diisocyanate to polymeric glycol of between 1.1:1 and 12:1 should be used at temperatures ranging from about 20 to about 150° C.

Any of a wide variety of organic diisocyanates may be employed for the preparation of the isocyanate-terminated polymer, including aromatic, aliphatic and cycloaliphatic diisocyanates and combinations of these types. Representative compounds include toluene-2,4-diisocyanate, mixtures of toluene-2,4- and -2,6-diisocyanates, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate) and 1,5-tetrahydronaphthylene diisocyanate. For purposes of the present invention, toluene-2,4-diisocyanate is preferred.

The isocyanate-terminated polymer is prepared in the agitated reaction vessels 3, 4, 5 and 6 of the attached drawing.

As pointed out above, the isocyanate-terminated polymer is extruded through an orifice, or spinneret, into an atmosphere containing water vapor. Any suitable means, such as air or nitrogen under pressure or a pressure pump, may be used for forcing the polymer through the orifice. As the polymer is allowed to fall freely through the atmosphere containing water vapor, water condenses on the stream of polymer since this stream is introduced into the atmosphere at a temperature below the dew point of the atmosphere. The dew point is the temperature of the atmosphere at which dew begins to form. It is quite obvious that as the concentration of water vapor in the atmosphere in the chamber decreases, the dew point temperature will also decrease. The atmosphere containing the water vapor may be any inert gas which will not react with the isocyanate-terminated polymer; however, air is by far the most convenient. Other inert gases which may be used include nitrogen, carbon dioxide, argon, neon, or gaseous fluorinated hydrocarbons. Additional inert gas may be introduced and used as a carrier for the water vapor when it is desired to lower the concentration below 100% relative humidity. For purposes of the present invention, the temperature of the atmosphere in the chamber through which the isocyanate-terminated polymer is introduced should be between 50 and 100° C. At the higher temperatures, a greater quantity of water can be present in the atmosphere. For purposes of the present invention it is preferred that the dew point be above 60° C., that is, the water vapor concentration is such that it is saturated at 60° C.

The time that the isocyanate-terminated polymer is present in the chamber 11 containing the water vapor will depend upon a number of interrelated variables, such as the temperature of the polymer, the concentration of water vapor in the atmosphere of the chamber, the temperature of the atmosphere in the chamber and the size or diameter of the stream of polymer which is introduced. For purposes of the present invention, the polymer should be present in the atmosphere containing water vapor long enough to take up at least 0.5 mol of water per mol of polymer. The reaction of this amount of water will double the molecular weight of the polymer and the completion of the chain-extension will be carried out as the resultant mass is deposited on a moving belt 16 and passes through a heated reaction chamber 14.

The size or diameter of the stream of polymer falling through the atmosphere of water vapor may be varied within rather wide limits depending on the nature of the polymer and the subsequent treatment to be accorded the mixture. In the preferred case, the diameter of the stream is about 0.03 to about 0.10 inch. When operating with the preferred isocyanate-terminated polymer, which is prepared from a polytetramethylene ether glycol, this range will permit adequate increase in molecular weight within a reasonably short time after removal from the vapor chamber. Diameters somewhat greater than this may be used; however, with large diameters, longer times are required after the stream passes through the vapor zone for the chain-extension to take place, since the water has a greater distance to diffuse to permeate the interior of the mass.

The chamber 11 which contains the water in vapor form may be constructed of various materials; however, glass is preferred. It is to be understood that any material may be used which does not corrode excessively under the conditions of the reaction. This chamber may be of any size and shape so long as it permits a free, uninterrupted fall of the stream of polymer through the atmosphere of water vapor and is high enough so that there is sufficient time for at least 0.5 mol of water per mol of polymer to be taken up. It is to be understood that the present invention is not limited to the introduction of a single stream of isocyanate-terminated polymer into the chamber but that any convenient number of orifices may be used. In the case where several streams of polymer are extruded into the chamber, the orifices should be placed sufficiently far apart so that the falling streams do not coalesce.

After a sufficient amount of water vapor has condensed on the isocyanate-terminated polymer, that is, after the polymer has taken up at least 0.5 mol of water per mol of polymer, the resultant mass is continuously conveyed through a heated chamber which is maintained at a temperature of about 50 to 100° C. This continuous conveyance is accomplished by collecting the stream of isocyanate-terminated polymer having the water condensed thereon on a moving belt 16 and passing the belt through a heated chamber 14, during which time the water reacts with the free isocyanate groups. This reaction liberates carbon dioxide and simultaneously forms a porous structure while increasing the molecular weight of the polymer by connecting the polymer chains together through urea linkages. The residence time of the isocyanate-terminated polymer in this heated chamber should be sufficiently long to enable a self-supporting, porous structure to be formed.

The moving belt 16 which is used to continuously convey the isocyanate-terminated polymer and the resulting porous structure through the heated chamber should have a surface material from which the porous structure may be conveniently stripped. Thus, a belt surface of polyethylene film or polytetrafluoroethylene film is quite satisfactory; however, it is not necessary that the entire belt be made of this material. This moving belt should be wide enough so that when the polymer is reacting with the water to form a foamy mass, the mass will be allowed to flow so as to form a relatively wide strip which is not too thick. For purposes of the present invention, a thickness of not more than about one foot is preferred for processing. In order to insure that uniform chain-extension will take place throughout the foaming mass, it is desirable to prevent the evaporation of water from the upper surface of said mass. This can be accomplished by having a film, such as a polyethylene film, on the upper surface of the mass, or controlling the humidity of the chamber. As pointed out above, the moving belt should be wide enough so that the foaming mass will be allowed to flow; however, it is desirable that the moving belt be provided with sides so that the foaming mass will not run off the belt. It is also preferred that the moving belt be slanted so that the discharge end is lower than the end where the isocyanate-terminated polymer is introduced so the initial liquid will not flow backward on the belt.

The heated chamber 14, through which the moving belt passes carrying the isocyanate-terminated polymer and in which the reaction of water with the isocyanate groups takes place, may be of any desirable size and may be heated in any convenient way, such as by electrical heating elements or steam coils. The residence time of the isocyanate-terminated polymer in the heated chamber should be sufficient so that complete reaction of the water with the isocyanate groups can take place. It is quite obvious, therefore, that the temperature in the chamber and the speed of the belt passing through the chamber are interrelated. A residence time in the chamber of about 45 to 55 minutes is required when the chamber is at a temperature of about 70 to 80° C. The residence time in the chamber varies inversely with the temperatures. For purposes of the present invention, a residence time of 75 minutes at 60° C. to 40 minutes at 80° C. may be used. Lower temperatures obviously require longer times and temperatures above 100° C. are undesirable because at these temperatures the water is vaporized and will escape from the mass before it reacts with the isocyanate groups.

As the mass passes through the heated chamber, the water and isocyanate groups of the polymer react, with carbon dioxide being liberated. Thus, the mass is converted into a self-supporting, porous structure and as this structure emerges from the chamber, it is not tacky and the polyethylene or polytetrafluoroethylene surface films are stripped off and rolled up on idler rolls. The product at this stage of the reaction is an uncured, spongy elastomer and this spongy elastomer is immediately passed or rides off onto another belt 24, made of a porous weave, which carries the structure into the next treating chamber. This treating chamber is represented on the accompanying drawing by 27. The belt which carries the porous structure into this treating chamber may be made of any porous weave material, such as cotton, polyacrylic fiber, nylon or non-corroding wire.

The treating chamber into which the self-supporting, porous structure, or elastomer sponge, is carried is divided into three sections, 28, 29 and 30, each of which has an opening or openings in the support carrying the belt, which lies flat on said support, which openings are not as wide as the spongy mass. Suction is applied to the belt and to the structure through these openings by means of vacuum chambers 34, 35 and 36. The upper part of the chamber is divided into three comparable sections by means of skirts and each is supplied with the required treating atmosphere by suitable means.

In the first section, air at 60 to 80° C. is introduced above the sponge on the belt and is drawn through the sponge by the vacuum underneath the belt to remove the carbon dioxide from the sponge. The rate of passage of air through the section is governed by the mass of the sponge and the speed of movement of the belt. A minimum of about 1½ cu. ft. of air per cu. ft. of elastomer sponge is required. For a spongy strip about 6 to 8 inches wide and about 1 to 5 inches thick, an air passage rate of about 1.5 to 6.0 cu. ft. per minute appears desirable when the average residence time in the section is 4 to 5 minutes, so as to remove most of the carbon dioxide. The operation of this section is optional, though preferred. If it is not used, additional nitrogen base is required in the second section since it will react with the carbon dioxide removed from the spongy structure.

In the second section, stabilization of the elastomer sponge takes place by an atmosphere at 60–80° C. containing a nitrogen base. Here again the nitrogen base atmosphere is introduced above the sponge and is drawn through the sponge by the vacuum underneath the belt. The nitrogen base is conveniently ammonia although other nitrogen bases such as n-butylamine or piperidine are equally as satisfactory. Since the function of the nitrogen base is to react with any free isocyanate groups remaining in the polymer, there must be at least one hydrogen atom attached to the nitrogen. There should be only one nitrogen atom per molecule with a hydrogen attached and the base should have a basic ionization constant greater than $1 \times 10^{-12}$ in order to be sufficiently reactive. The stabilization of elastomers containing unreacted isocyanate groups against premature curing by means of a nitrogen base having a basic ionization constant of at least $1 \times 10^{-12}$, is more particularly described in co-pending application of Nelson et al., Serial No. 379,291, filed September 9, 1953. The atmosphere of nitrogen base may be conveniently recycled to conserve the base and additional nitrogen base may be added to replace that removed by reaction with the elastomer sponge. For purposes of the present invention, an atmosphere containing ammonia is preferred and the amount of ammonia may range from about 0.5 to 50%. Higher amounts may be used at decreased flow rates. An atmosphere of about 1–2% ammonia in air is preferred. The rate of passage of the nitrogen base atmosphere through the sponge is about the same as the rate of passage of air through the sponge in the preceding section. Thus, a minimum of about 1½ cu. ft. of atmosphere per cu. ft. of elastomer sponge is required. The sponge must be exposed to an excess of at least 100% of the theoretical amount of nitrogen base required to react with all of the free isocyanate present.

In the third section of this treating chamber, dry air is drawn through the elastomer sponge by the vacuum underneath the belt to remove water and excess nitrogen base atmosphere. In this section, the rate of passage of dry air is about 200–1000 cu. ft. per cu. ft. of elastomer. It is to be understood that in all three of these sections, the rate of passage of either the air or nitrogen base atmosphere may be varied within wide limits and the corresponding residence time in these sections may likewise be varied. The temeperature of the incoming air in the third section should be at least 60° C. The relative humidity is not critical if ordinary atmospheric air is taken and heated to about 60° C. The maximum temperature of the air should be not greater than about 150° C. It is to be understood that less air is required to dry the elastomer sponge when the air is at the higher temperatures.

As the porous structure or spongy elastomer emerges from this three-section treating chamber, it has been stabilized against premature curing and is unchanged in physical appearance. Since it is stabilized, it may be stored as a sponge or can be used as a working sponge. It may also be run directly through a roll to compress it and may then be fed in small pieces onto a rubber roll mill and milled to work out all of the air cells. After milling, it is discharged off the mill in a solid sheet of stabilized elastomer which can be handled on conventional rubber processing machinery, compounded with curing agents and additives, and cured to form any of a wide variety of valuable elastomeric articles, such as tires, tubes, belts, etc. The elastomers are characterized by a number of advantageous properties, such as outstanding resistance to mechanical abrasion and to deterioration caused by flexing, stretching and the like.

The following examples will better illustrate the nature of the present invention; however, the invention is not intended to be limited to these examples. Parts are by weight unless otherwise indicated.

*Example 1*

(a) The apparatus used consists of: a feed tank for the polyurethane glycol and a feed tank for toluene-2,4-diisocyanate; positive displacement pumps for feeding these materials to the reaction vessels; 4 agitated vessels, each of about 1000 cc. holdup capacity, arranged in a cascade relation so that the first overflows into the second by gravity; a positive displacement pump for feeding the overflow from the fourth vessel through a 10-foot length of 0.5-inch copper tubing to a 0.070-inch diameter spinneret located at the top of a glass cylinder 36 inches long and 6 inches in diameter in which an atmosphere of steam is maintained at about 100° C. The filament of polymer drops from the cylinder onto a sheet of polyethylene about 12 inches wide which is supported on a continuous, endless belt with a travel of about 6 feet. The polymer is continuously covered with a second sheet of polyethylene. The belt carries the polyethylene-encased polymer through an oven maintained at 70 to 75° C. As the polymer emerges from the oven, it is in the form of a firm, porous, continuous structure from which the polyethylene sheets are stripped. The polymer falls onto another continuous belt on which it is conveyed into another enclosure. In the first part of the enclosure, air at 60° C. is drawn through the polymer. In the middle part, ammonia at 60° C. is drawn through the polymer to stabilize it, and in the last portion, air at 65–70° C. is drawn through to remove the excess ammonia. From this unit, the polymer is discharged into any convenient receptacle.

(b) 960 parts of polytetramethylene ether glycol of average molecular weight 960 and 116 parts of toluene-2,4-diisocyanate are stirred together at 100–105° C. for 3 hours. The viscous liquid is a polyurethane glycol containing on the average three polyether glycol moieties joined by two diisocyanate moieties.

The polyurethane glycol is fed to the first reaction vessel at a rate of 2400 g. per hour while toluene-2,4-diisocyanate is simultaneously fed in at a rate of 294 g. per hour. The temperature in each of the vessels is held at 78–82° C. by controlled heating.

The overflow from the fourth reaction vessel is pumped through the copper tubing to cool it to 35–40° C. and is then forced through an orifice of a spinneret into a glass cylinder. In the glass cylinder, about 110 g. of steam per hour is condensed on the thin stream. The mass falls on a moving belt having a polyethylene surface.

Here the mass is passed through an oven heated to a temperature of 70–75° C. and it foams and slowly sets to a rubbery sponge. The belt travels about 1.5 inches per minute so that the average residence time in the oven is about 50 minutes. The chemical reaction involved here is a reaction between water and the isocyanate-terminated polymer. Carbon dioxide is evolved which causes the frothing and sponge formation. The use of the polyethylene cover sheet prevents water evaporation from the surface of the polymer, which would result in uneven reaction.

As the mass emerges from the heated oven, it is self-supporting and only slightly tacky. The polyethylene sheets are stripped off and the spongy strip falls onto an endless belt and is carried through a three-chambered enclosure where, in the first part, 3 cubic feet of air per minute is drawn through it for 4 minutes to remove the carbon dioxide, then 3 cubic feet per minute of air containing 1.5% ammonia by volume is drawn through it to stabilize it by reacting with any free isocyanate groups and finally 12 cubic feet of dry air per minute is drawn through it to remove excess ammonia and to dry it. The product emerges unchanged in physical appearance.

(c) A portion of the polymer is milled to a smooth sheet on a rubber mill. It has a Mooney viscosity (small rotor) at 100° C. of about 67 at 4 minutes and about 60 at 10 minutes.

A portion of the polymer is milled on a rubber mill at 100–105° C. for 10 minutes and sheeted off as a smooth sheet. 100 parts of this is then milled with 2 parts of 4,4'-methylene-di-o-tolyl isocyanate and placed in a mold in a press and cured at 134° C. for 60 minutes. The snappy elastomer which is obtained shows the following properties after aging 14 days at room temperature at 50% relative humidity:

|  | 25° C. | 70° C. |
| --- | --- | --- |
| Tensile strength at break, lbs./sq. in | 3,550 | 1,250 |
| Modulus at 300% elongation, lbs./sq. in | 450 | 390 |
| Elongation at break, percent | 590 | 740 |

*Example 2*

The process of Example 1 was repeated except the single orifice of the spinneret was replaced by a plate having four orifices 0.04 inch in diameter. The centers were ⅜ inch apart diametrically across and ¼ inch apart from adjacent orifices. The filaments passed through the cylinder without coalescing. The mass was treated in the same way and the resulting elastomer was essentially equivalent to that of Example 1.

*Example 3*

(a) The apparatus used in this example differs from that of Example 1 in that the chamber into which the isocyanate-terminated polymer was forced was a glass cylinder 2.25 inches in diameter and 24 inches long. Around it was a second cylinder attached by rubber stoppers and having an inlet for steam at the top of the so-formed jacket and an outlet at the bottom. The polymer blow case of 2-inch iron pipe, 6 inches long, was used with the orifice of 0.052-inch diameter. The chain-extension water vapor is furnished as a less than saturated air stream by passing air through a vessel filled with water at a given temperature and then passing this moisture laden air into the chain-extension zone through a heated line where its temperature is raised. The chain-extension zone is held at a temperature higher than that of the water by passing steam through the jacket.

(b) 3 mols of polytetramethylene ether glycol of molecular weight 960 and 2 mols of toluene-2,4-diisocyanate are stirred together for 3 hours at 100–105° C. to form a polyurethane glycol. 2027 parts of this polyurethane glycol is heated to 65–70° C. while agitating and 263 parts of toluene-2,4-diisocyanate is added. The mass is stirred at 70–75° C. for 2.5 hours to form the isocyanate-terminated polymer. The mass is cooled to 30° C. Pressure is applied to the blow case and the polymer is forced through the orifice at a rate of 20 g. per minute.

Air at a rate of 0.5 cubic foot per minute is passed through a vessel filled with water at a temperature of 74° C. and through the preheated tube into the chain-extension cylinder. The jacket of the cylinder is heated by passing 100° C. steam through it. The temperature of the air-water vapor in the cylinder is 85° C. The relative humidity is calculated to be 63%.

The stream of polymer on which the water vapor has condensed is allowed to fall on a moving belt, is passed through a heated oven and is then treated as in Example 1. The elastomer obtained is equivalent to that of Example 1.

As many widely different embodiments of this invention may be made without departing from the spirit and scope thereof, it is to be understood that this invention is not limited to the specific embodiments thereof except as defined in the appended claims.

What is claimed is:

1. A continuous process for preparing stable polyurethane elastomers which comprises continuously extruding an isocyanate-terminated polyurethane polymer into an atmosphere containing water vapor, said polyurethane polymer being prepared by reacting an organic diisocyanate with a polymer having a molecular weight of from about 750 to 10,000 said polymer being selected from the group consisting of polyalkyleneether glycols, polyalkylenearylene ether glycols, polyalkylene etherthioether glycols and alkyd resins containing two terminal hydroxyl groups, in a molar ratio of said diisocyanate to said polymer of between 1.1:1.0 and 12:1.0, said polyurethane polymer being extruded at a temperature below the dew point of the said atmosphere, maintaining said polyurethane polymer in said atmosphere until at least 0.5 mol of water per mol of isocyanate-terminated polyurethane polymer has been taken up, continuously conveying the resultant mass through a chamber maintained at about 50 to 100° C. until a self-supporting, porous structure is formed, continuously conveying said porous structure through a chamber wherein air at a temperature of from about 60 to 80° C. is drawn through said structure, followed by drawing the vapor of a nitrogen base having only one nitrogen atom with hydrogen attached thereto and having a basic ionization constant greater than $1 \times 10^{-12}$ through said porous structure at a temperature of from about 60 to 80° C. to stabilize it, followed by drawing dry air at a temperature of from about 60 to 150° C. through said porous structure, and recovering the resultant stable polyurethane elastomer.

2. The process of claim 1 wherein the isocyanate-terminated polyurethane polymer is prepared by reacting a polyalkylene ether glycol having a molecular weight of from about 750 to 10,000 with an organic diisocyanate in a molar ratio of diisocyanate to glycol of between 1.1:1 and 12:1.

3. The process of claim 2 wherein the polyalkylene ether glycol is a polytetramethylene ether glycol and the organic diisocyanate is toluene-2,4-diisocyanate.

4. A process according to claim 2 wherein the molar ratio of diisocyanate to glycol is between about 1.4:1 and 1.5:1.

5. A continuous process for preparing stable polyurethane elastomers which comprises continuously extruding an isocyanate-terminated polyurethane polymer into an atmosphere containing water vapor, said polyurethane polymer being prepared by reacting an organic diisocyanate with a polymer having a molecular weight of from about 750 to 10,000 said polymer being selected from the group consisting of polyalkyleneether glycols, polyalkylenearylene ether glycols, polyalkylene etherthioether glycols and alkyd resins containing two terminal hydroxyl groups, in a molar ratio of said diisocyanate to said polymer of between 1.1:1.0 and 12:1.0, said polyurethane polymer being extruded at a temperature below the dew point of said atmosphere, maintaining said polyurethane polymer in said atmosphere until at least 0.5 mol of water per mol of isocyanate-terminated polyurethane polymer has been taken up, continuously conveying the resultant mass through a chamber wherein air at a temperature of from 60 to 80° C. is drawn through said structure, followed by drawing ammonia vapor at a temperature of from 60 to 80° C. through said porous structure to stabilize it, followed by drawing dry air at a temperature of from 65 to 70° C. through said porous structure, and recovering the resultant polyurethane elastomer.

References Cited in the file of this patent

UNITED STATES PATENTS

| | | |
|---|---|---|
| 2,721,811 | Dacey et al. | Oct. 25, 1955 |
| 2,726,219 | Hill | Dec. 6, 1955 |